United States Patent Office 3,534,971
Patented Oct. 20, 1970

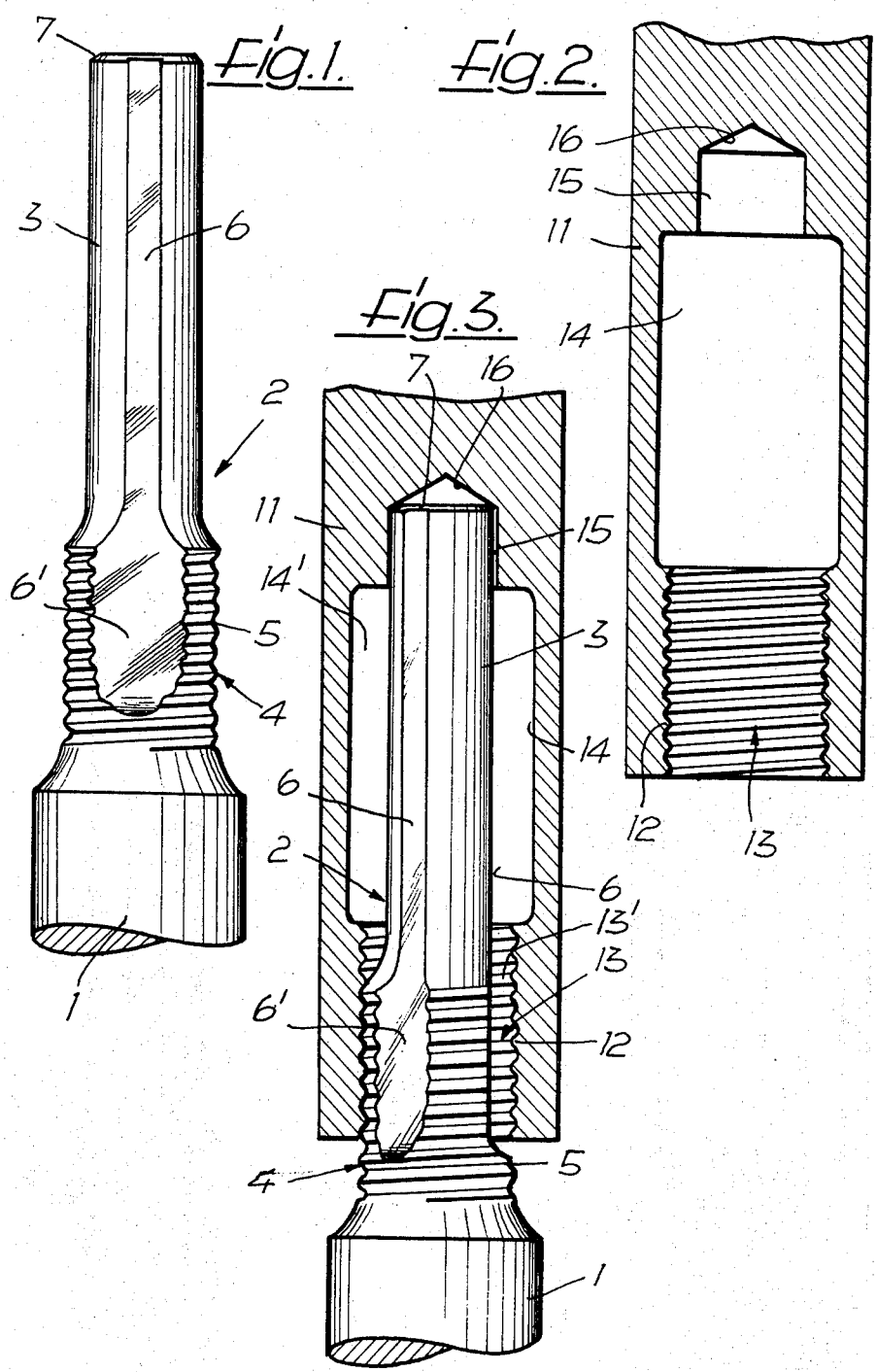

3,534,971
BORING TOOL
Heinrich Mindermann, Uphusen, Kreis Verden (Aller), Germany, assignor to Gebruder Heller, Uphusen, Kreis Verden (Aller), Germany, a firm
Filed Feb. 20, 1968, Ser. No. 706,860
Claims priority, application Germany, Feb. 21, 1967, H 61,910
Int. Cl. B23b 47/34, 51/12
U.S. Cl. 279—99                                    10 Claims

ABSTRACT OF THE DISCLOSURE

A boring tool consisting of a drill and an adapter for extending the length of the drill when necessary, wherein the drill shank has a mounting end adapted to be clamped by a chuck of a boring machine, and the adapter has an axial socket bore for receiving the mounting end, and the socket bore and the mounting end have corresponding screw threads along a part of their lengths for securing the adapter to the drill and for transmitting the driving torque to the drill when the adapter is mounted in the boring machine.

---

The present invention relates to a boring tool in the form of a drill with a cylindrical shank portion on one end which is designed so as either to be clamped directly by a chuck or the like of a boring machine or to be inserted into and secured to the socketlike bore of a drill adapter which serves as an extension of the drill and is then clamped by the chuck of the boring machine. The invention further relates to such a drill adapted and also to the combination of such a drill with such an adapter to form a two-part boring tool.

Boring tools of the above-mentioned type are frequently used especially mounting drills for drilling stone. The cylindrical mounting end of the shank of such a drill as previously known merges into a part of a hexagonal shape which, when inserted into a corresponding hexagonal part of the socketlike end of an adapter, serves to transmit the driving torque of the adapter to the drill. The cylindrical mounting part of the drill shank and the corresponding cylindrical bore in the adapter then serves for guiding the drill in the axial direction. For insuring that, when a hole has been drilled, the drill will be withdrawn from it, the drill and the adapter are additionally secured to each other by a radially extending screw.

This known manner of connecting such an adapter to a drill has considerable disadvantages especially when the drill is used in a percussion drill gun for drilling holes into stone, for example, concrete. Drill guns of this type not only rotate the drill but also exert axial impacts thereon. The vibrations which are caused by these impacts and the rebound of the drill tend to loosen the connection between the drill and the adapter with the result that additional vibrations may occur. This, in turn, may result in deformations on the drill shank and in the socket of the adapter which may even lead to a destruction of the mounting end of the drill shank. These known boring tools also have the disadvantage that drilling dust or other foreign matter may easily enter between the mounting end of the drill and the socket of the adapter and cause further damage to these parts.

It is an object of the present invention to provide a boring tool of the type as mentioned in the beginning which permits the driving torque as well as the axial movements of the adapter, for example, the percussion strokes thereof, to be positively transmitted in a very simple manner and without play to the drill, and which also prevents dust or other foreign matter which might be produced in the drilling operation, for example, when drilling in masonry or the like, from causing any damage to the tool.

For attaining this object, the present invention provides the base or root of the mounting end of the drill shank with a screw thread which has an outer diameter larger than that of the cylindrical mounting end of the drill shank and turns in the same direction, as seen from the free end of the drill shank, in which the drill rotates during the drilling operation. Accordingly, the outer end of the socket bore in the drill adapter is provided with a corresponding screw thread.

Another feature of the invention consists in providing this screw thread along the length of a first part of the socket bore in the adapter which is followed by a second part of a larger inner diameter which terminates into a cylindrical end part which has a conical bottom and an inner diameter substantially corresponding to the diameter of the end of the mounting part of the drill shank and is adapted to receive and guide the cylindrical end part of the mounting end of the drill.

Another feature of the invention consists in making the entire socket bore of the drill adapter of a shorter length than the mounting end of the drill shank. Since the root part of this mounting end is provided with a screw thread, this mounting end may be inserted and screwed so deep into the adapter that its free end will abut tightly against the bottom of the socket bore. If the boring tool according to the invention is employed in a percussion drill gun, the impacts which are then exerted upon the adapter will be directly transmitted to the drill by these abutting end surfaces and by the interengaging screw threads. These impacts will, however, not exert any stresses upon the screw threads. Since the direction of the screw threads on the mounting end of the drill shank and in the socket bore of the adapter corresponds to the direction of rotation of the drill during the drilling operation, and since this mounting end including its screw thread has a greater length than the entire socket bore, the torque of the adapter which is transmitted to the drill will always tend to screw the two elements more tightly into each other so that the end of the drill shank will always abut firmly without play against the bottom of the socket bore in the adapter. Since the internal screw thread in the adapter only extends along the length of a first part of the socket bore and the adjacent second part has a larger diameter, an annular chamber is formed between the cylindrical part of the mounting end and the wall of the adapter. Since according to another feature of the invention at least the screw threaded part of the drill is provided with axially extending channels in the form of flat surfaces, dust and other foreign matter which may occur especially when drilling in stone will pass into and collect in this annular chamber without causing any damage to the two elements of the boring tool. Since this second part of the socket bore which forms the annular chamber terminates into a third cylindrical end part which has a conical bottom, and since the free end of the mounting part of the drill is tapered accordingly, this mounting part when inserted and screwed into the adapter will be very accurately centered within the adapter and thus the drill itself will likewise be accurately centered relative to the adapter.

The boring tool according to the invention therefore has the advantages that during a drilling operation the driving torque will be transmitted by the interengaging screw threads from the adapter to the drill, that the energy of the percussions produced by the drill gun will be transmitted by the bottom surface of the third part of the socket bore in the adapter to the end of the drill shank without exerting any load upon the screw threads, and that dust and other foreign matter which occurs especially when drilling into stone will be deposited in the annular chamber which is formed by the enlarged second part of the socket bore.

According to a preferred embodiment of the invention, this second part of the socket bore is also made of a greater length than either of its two other parts so as to form a dirt collecting chamber of the largest possible size, while the third part of the socket bore may be made shorter than the first part so as to insure that as little dust or the like as possible will enter this third part and those impurities which might have entered will easily pass back into the large second part. Since this third part of the socket bore has a conical bottom and the end of the cylindrical mounting part of the drill is tapered accordingly, it only needs to be made of a very short length in order to insure that the drill shank will be accurately centered relative to the adapter.

Another feature of the invention consists in providing the cylindrical mounting end of the drill shank with flat surfaces of a narrow width which extend axially along the entire length of the cylindrical mounting part and also almost entirely through the screw thread so that, when the mounting end of the drill shank is screwed as far as possible into the socket bore of the adapter, the inner ends of these flat surfaces will extend beyond the adapter and form openings through which dust or other impurities can enter from the outside. These flat surfaces within the screw thread also have the advantage that, when the mounting end of the drill shank is being screwed into the adapter, any impurities which might be deposited on the screw thread will be wiped off the latter into these intermediate areas. The flat surfaces on the mounting end of the drill shank also increase the volume of the area within which impurities may collect.

Another feature of the invention consists in providing the mounting end of the drill shank with three of these flat surfaces which are disposed at an angle of 120° from each other. This has the advantage that, when the drill is to be mounted in a drill gun without an adapter, the jaws of the chuck of this gun will engage upon these flat surfaces, hold the drill more securely, and properly transmit the driving torque to the drill.

The various features and advantages of the present invention will become further apparent from the following detailed description thereof which is to be read with reference to the accompanying drawings, in which—

FIG. 1 shows a side view of the mounting end of a drill shank according to the invention;

FIG. 2 shows an axial section of the socket part of a drill adapter which serves as an extension of a drill which has a mounting end as illustrated in FIG. 1; while FIG. 3 shows the assembled boring tool consisting of a drill adapter according to FIG. 2 and likewise shown in axial section, and of the mounting end of a drill according to FIG. 1 and likewise shown in a side view.

As illustrated in the drawings, the drill 1 of which only the upper end portion is shown comprises a mounting end 2 which consists of an upper cylindrical part 3 and a lower or root part 4 which is provided with a screw thread 5 of a larger outer diameter than that of the cylindrical part 3. This cylindrical part 3 is provided with flat surfaces 6 which extend in the axial direction from the free end of the cylindrical part to a point within the screw thread 5 on the lower part 4 and have a relatively small width as compared to their axial length. As may be seen especially in FIG. 1, the larger diameter of the threaded lower part 4 also causes the parts 6' of the flat surfaces on this lower part to have a larger width than those on the cylindrical part 3. The flat surfaces 6, 6' are preferably offset peripherally to each other at an angle of 120°. Consequently, the mounting end 2 of the drill is provided with three of these surfaces 6, 6' which permit this end to be securely clamped by the jaws of the chuck of a drill gun when the drill is to be employed without an extension adapter. The free end of the cylindrical part 3 of the drill is provided with a tapered surface 7.

FIG. 2 illustrates the socket part of a drill adapter 11 which is to be used as an extension of the drill 1. The socket bore of this drill adapter 11 is divided into three axially adjacent parts of different diameters. The first part 13 at the lower end of the adapter 11 is provided with an internal thread 12 which extends along the entire length of this part and corresponds to the external thread 5 on the mounting end 2 of drill 1. The second part 14 forms a cylindrical chamber which has a larger diameter and also a greater length than the threaded first part 13. This second part 14 terminates into a third cylindrical part 15 which has a diameter substantially equal to that of the cylindrical part 3 of the drill 1 and is provided with a conical bottom surface 16 of an angularity equal to that of the tapered surface 7 of the drill. This third part 15 is shorter than either of the two other parts 13 and 14 of the socket bore.

FIG. 3 illustrates the boring tool in its assembled condition. The mounting end 2 of the drill shank then extends so far into the bore of the drill adapter 11 that the tapered surface 7 abuts tightly against the conical bottom surface 16 of the third part 15 of the bore and the two screw threads 5 and 12 are screwed tightly together and as far as possible into each other. Consequently, the driving torque which is exerted upon the drill adapter 11 when the same is clamped in the rotating chuck of a drill gun will be transmitted to the drill 1 by the two interengaging screw threads 5 and 12, and since the tapered end surface 7 of the drill and the conical bottom surface 16 of the adapter 11 are in direct contact with each other, the axial forces which are exerted upon the adapter, for example, by the impacts produced by a percussion drill gun, will be directly transmitted to the drill 1. Since the cylindrical upper part of the mounting end 2 of drill 1 engages into the third part 15 of the bore in the adapter 11 and the tapered surface 7 and the bottom surface 16 are in direct contact with each other, the drill is perfectly centered within the adapter 11. Since the widest second part 14 of the bore in the adapter 11 forms an annular chamber 14' around the cylindrical part 3 of the drill and the flat surfaces 6' within the threaded part 5 of the drill form channels 13', dust or other impurities which cannot be avoided especially when drilling stone may pass through these channels into chamber 14' or collect in both of them without danger that the drill or its adapter might be damaged.

Although my invention has been illustrated and described with reference to the preferred embodiment of the invention, I wish to have it understood that it is in no way limited to the details of such embodiment but is capable of numerous modifications within the scope of the appended claims.

Having thus fully disclosed my invention, what I claim is:

1. A boring tool comprising a drill having a shank and a mounting part on one end of said shank and coaxial therewith, said mounting part comprising a substantially cylindrical end portion and a part intermediate said shank and said end portion, said intermediate part having an outer diameter larger than that of said end portion and having an external screw thread extending along its length and in the direction in which said drill is rotatable when drilling, as seen from said cylindrical end portion, wherein said mounting part has a plurality of flat surfaces each extending from said mounting part in the axial direction at least to a point within the length of said screw-threaded intermediate part.

2. A boring tool as defined in claim 1, wherein said cylindrical end portion has a length considerably greater than that of said screw-threaded intermediate part.

3. A boring tool as defined in claim 1, wherein said plurality of flat surfaces are angularly spaced from each other at angles of 120°.

4. A boring tool as defined in claim 1, further comprising a rod-shaped adapted for extending the length of said drill, said adapter having a socket bore in one end thereof extending coaxially therein, said socket bore having a length shorter than that of said mounting part of said drill and forming three axially successive sections of different inner diameters, the first of said sections adjacent to said end of said adapter having an internal screw thread corresponding to and adapted to be screwed upon said screw thread on said drill, the second of said sections having an inner diameter substantially larger than that of said first threaded section, and a third of said sections having an inner diameter substantially equal to the diameter of said cylindrical end portion and adapted to receive and guide the free end of said end portion.

5. A boring tool as defined in claim 4, wherein said second section of said socket bore has a length greater than that of said threaded first section and that of said third section.

6. A boring tool as defined in claim 5, wherein said third section is shorter than said threaded first section.

7. A boring tool as defined in claim 4, wherein said flat surfaces are spaced at an angle of 120° from each other and are adapted to be gripped by the jaws of a chuck of a boring machine when said mounting part is inserted therein without said adapter and to serve as channels for receiving drilling waste and the like for passing the same into said larger second section of said socket bore when said adapter is screwed upon said mounting part and is driven by a boring machine.

8. A boring tool as defined in claim 4, wherein said screw threads on said mounting part of said drill and in said first section of said socket bore of said adapter are knuckle threads.

9. A boring tool as defined in claim 4, wherein said mounting part of said drill has a plurality of flat surfaces each extending from the free end of said mounting part in the axial direction at least to a point within the length of said screw-threaded part of said mounting part, said points being exposed to the outside and not covered by said adapter when said mounting part of said drill is screwed as far as possible into said socket bore.

10. A boring tool as defined in claim 4, wherein said third section of said socket bore has a conical bottom surface, and said end portion of said mounting part of said drill has a tapered surface having an angularity substantially equal to that of said conical bottom surface and tightly abutting thereon when said mounting part of said drill is screwed into said socket bore.

References Cited

UNITED STATES PATENTS

| | | | |
|---|---|---|---|
| 1,211,080 | 1/1917 | Carter | 287—125 X |
| 1,849,510 | 3/1932 | Thomson | 287—125 |

ROBERT C. RIORON, Primary Examiner

D. D. EVENSON, Assistant Examiner

U.S. Cl. X.R.

77—71